United States Patent
Kim et al.

(10) Patent No.: US 12,355,136 B2
(45) Date of Patent: Jul. 8, 2025

(54) SYSTEM AND METHOD FOR AN EMBEDDED FLEXIBLE SHEET ANTENNA FOR NARROW BORDER DISPLAY

(71) Applicant: Dell Products, LP, Round Rock, TX (US)

(72) Inventors: Changsoo Kim, Cedar Park, TX (US); Jay M. Zill, Round Rock, TX (US); Anthony J. Sanchez, Pflugerville, TX (US); Sumana Pallampati, Austin, TX (US)

(73) Assignee: DELL PRODUCTS LP, Round Rock, TX (US)

(*) Notice: Subject to any disclaimer, the term of this patent is extended or adjusted under 35 U.S.C. 154(b) by 323 days.

(21) Appl. No.: 17/731,806

(22) Filed: Apr. 28, 2022

(65) Prior Publication Data

US 2023/0352809 A1    Nov. 2, 2023

(51) Int. Cl.
*H01Q 1/22* (2006.01)
*H01Q 1/24* (2006.01)
*H01Q 9/04* (2006.01)
*H04M 1/02* (2006.01)

(52) U.S. Cl.
CPC ......... *H01Q 1/2266* (2013.01); *H01Q 1/243* (2013.01); *H01Q 9/0421* (2013.01); *H04M 1/0266* (2013.01)

(58) Field of Classification Search
CPC ............... H01Q 1/2266; H01Q 1/42
See application file for complete search history.

(56) References Cited

U.S. PATENT DOCUMENTS

| | | | | |
|---|---|---|---|---|
| 2012/0223866 A1* | 9/2012 | Ayala Vazquez | ...... | H01Q 21/28 343/893 |
| 2013/0321216 A1* | 12/2013 | Jervis | .......... | H04M 1/0216 343/702 |
| 2017/0373376 A1* | 12/2017 | Jo | .......... | H01Q 1/50 |
| 2020/0104667 A1* | 4/2020 | Boyer | .......... | G06K 19/07336 |
| 2021/0296766 A1* | 9/2021 | Li | .......... | H04M 1/026 |

* cited by examiner

*Primary Examiner* — Dimary S Lopez Cruz
*Assistant Examiner* — Austin M Back
(74) *Attorney, Agent, or Firm* — Prol Intellectual Property Law, PLLC; H. Kenneth Prol Prol

(57) ABSTRACT

An information handling system may include a processor, a memory, a power management unit, an antenna controller to provide instructions to a radio to cause a flexible sheet antenna to transceive wirelessly with a network, where the flexible sheet antenna has an antenna structure formed on a flexible sheet circuit, and an antenna holder around which the flexible sheet antenna is wrapped, wherein the flexible sheet antenna and antenna holder are placed within an edge cavity portion of a display chassis sharing the edge cavity with one or more interfacing hook structures used to couple a first chassis cover portion of the display chassis to a second chassis cover portion of the display chassis.

20 Claims, 9 Drawing Sheets

SYSTEM AND METHOD FOR AN EMBEDDED FLEXIBLE SHEET ANTENNA FOR NARROW BORDER DISPLAY

FIELD OF THE DISCLOSURE

The present disclosure generally relates to an antenna system of, for example, an information handling system. The present disclosure more specifically relates to the placement and orientation of an antenna system in a housing of an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a wireless antenna system formed within a display chassis of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
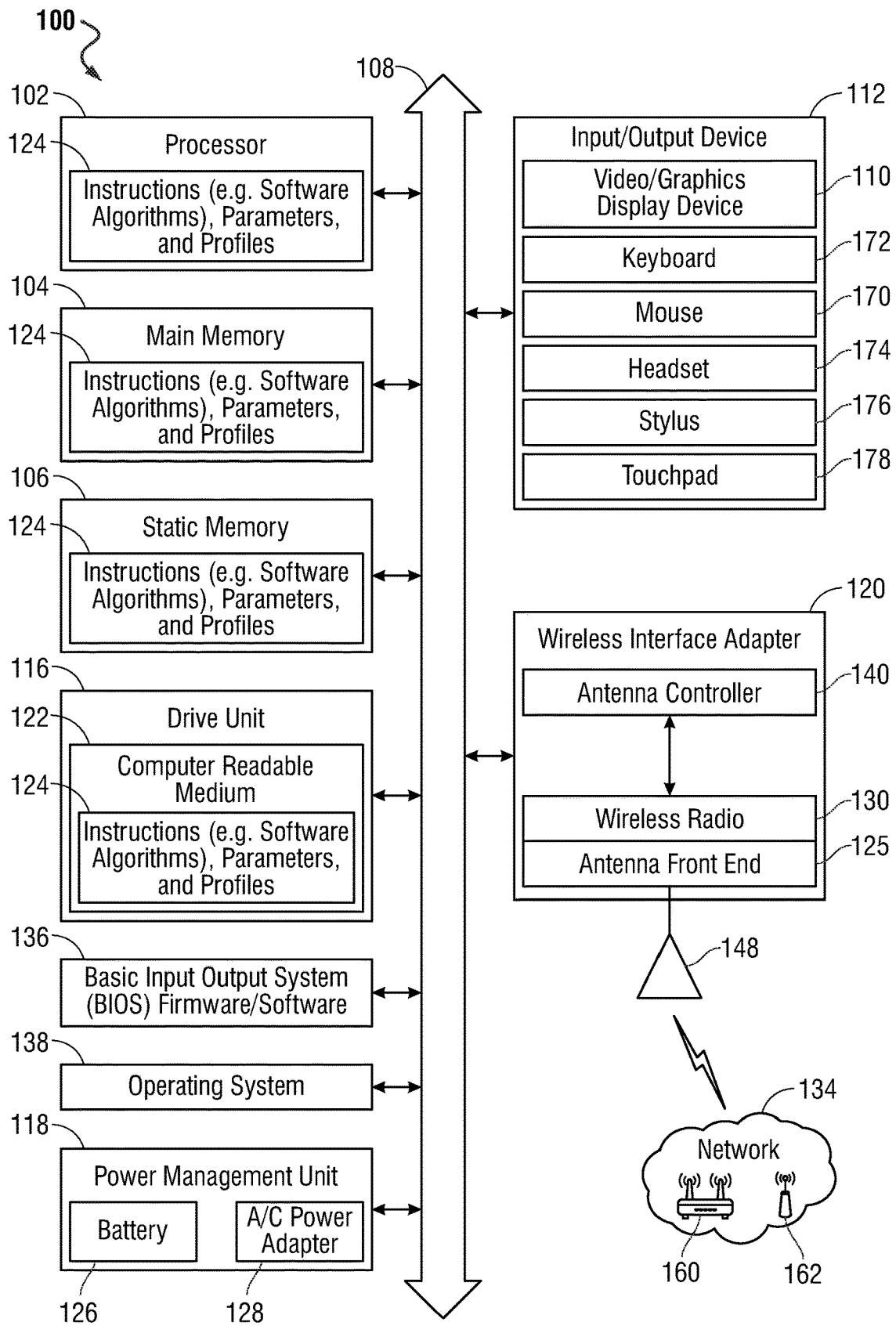
FIG. 1 is a block diagram illustrating an information handling system with an antenna system such as a flexible sheet antenna according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Embodiments of the present disclosure provide for a system and method for reducing the space occupied within a chassis of an information handling system by an antenna. In example embodiments of the present disclosure, the antenna may be a flexible sheet antenna that is wrapped around a portion of an antenna holder. The antenna holder may be shaped such that when the flexible sheet antenna is wrapped around the antenna holder, the antenna may be inserted into a portion of the chassis, such as the display chassis, where a first portion of that chassis is secured to a second portion of that chassis via, for example one ore more interfacing hook structures. In the context of the present specification, the information handling system may be any type of information handling system that includes a display chassis such as a 360-degree laptop type information handling system. In these embodiments, the chassis of the information handling system may include a display housing that includes an "a-cover" which serves as a back cover for the display housing and a "b-cover" which may serve as the bezel for a display screen of the information handling system such as a laptop information handling system. In this example embodiment, this laptop information handling system may have a chassis that forms a base housing and includes a "c-cover" housing a keyboard, touchpad, speaker grill, and any cover in which these components are set and a "d-cover" housing a processing device, memory the PMU, wireless interface adapter and other components of the information handling system in the base housing for the laptop information handling system. In the example embodiments described herein, the antenna that includes the flexible sheet antenna and antenna holder may be placed in a location where the one or more interfacing hood structures are used to secure the a-cover the to b-cover (e.g., a bezel) instead of placing these antenna components in locations within the display chassis that increases the sizes (e.g., thickness) of the display chassis.

In an embodiment, the flexible sheet antenna and antenna holder may be placed at a top edge of the display chassis placing the antenna at a location where transception via the antenna can be facilitated. In an embodiment, the a-cover or b-cover of the display chassis may include a radio frequency (RF) transparent window located by the antenna at a top portion of the display chassis. This RF transparent window may allow for the antenna to transceive through the display chassis. In an embodiment, the a-cover or b-cover of the display chassis may be made of an RF transparent material such as a plastic. Again, this may allow for the transception via the antenna.

Turning now to the figures, FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 160, a base station transceiver 162, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions. In an embodiment, a collection of systems or subsystems may include a client device interfacing, via a network or wireless network, with processing resources at, for example, a server to execute computer code to perform one or more computer functions described herein.

The information handling system may include memory (volatile (e.g., random-access memory, etc.), nonvolatile (read-only memory, flash memory etc.) or any combination thereof), one or more processing resources, such as a central processing unit (CPU), a graphics processing unit (GPU), or other processing hardware. In an embodiment, software or firmware code instructions 124 may be executed by a processing device described herein. Additional components of the information handling system 100 may include one or more storage devices, one or more communications ports for communicating with external devices, as well as various input and output (I/O) devices 112, such as a keyboard 172, a touchpad 178, a mouse 170, a headset 174, a stylus 176, a video/graphic display device 110, or any combination thereof. Portions of an information handling system 100 may themselves be considered information handling systems 100.

Information handling system 100 may include devices or modules that embody one or more of the devices or execute instructions for the one or more systems and modules described herein, and operates to perform one or more of the methods described herein. The information handling system 100 may execute code instructions 124 (e.g., via a processing device) that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code instructions 124 that is either firmware or software code. Moreover, the information handling system 100 may include memory such as main memory 104, static memory 106, or other memory of computer readable medium 122 storing instructions 124 executable by the antenna controller 140 or any other processing device, and drive unit 116 (volatile (e.g., random-access memory, etc.), nonvolatile memory (read-only memory, flash memory etc.) or any combination thereof. The information handling system 100 may also include one or more buses 108 operable to transmit communications between the various hardware components such as any combination of various input and output (I/O) devices described herein.

The information handling system 100 may further include a video/graphics display device 110. The video/graphics display device 110 in an embodiment may function as a liquid crystal display (LCD), an organic light emitting diode (OLED), a flat panel display, or a solid-state display. Additionally, the information handling system 100 may include an input device 112 that allows the user to interface with the information handling system 100 via the video/graphics display device 110, such as a cursor control device (e.g., a mouse 170, a touchpad 178, or gesture or touch screen input), and a keyboard 172, or stylus 176, among others. Various drivers and control electronics may be operatively coupled to the bus 108 and processor 102 which may, when executing computer readable instructions, allow a user to interact with the video/graphics display device 110 using any wired or wireless input/output device 112 (e.g., the stylus 176, mouse 170, keyboard 172, etc.) described herein.

The network interface device in FIG. 1 is shown as wireless interface adapter 120 but may also be a wired network interface device as is understood in the art and may provide connectivity to a network 134, e.g., a wide area network (WAN), a local area network (LAN), wireless local area network (WLAN), a wireless personal area network (WPAN), a wireless wide area network (WWAN), or other network. The network interface device shown as wireless interface adapter 120 may provide connectivity to a network 134 including one or more access points 160 or base stations 162 via operation of any type of wireless radio 130 and antenna front end 125 such as a WLAN radio and WLAN antenna front end and/or a WWAN radio and WWAN antenna front end being controlled by an antenna controller 140. It is appreciated that any number of radios 130 and RF front ends 125 may be associated with a plurality of antennas 148 within the information handling system and may operate under any wireless protocol described herein. In an embodiment, a flexible sheet antenna according to embodiments of the present disclosure formed on a flexible circuit substrate may be installed into the display chassis with an antenna holder at a location where interfacing hook structures are used to couple a first portion of the display chassis (e.g., an a-cover) to a second portion of a display chassis (e.g., a b-cover). Connectivity to the network 134 may be via wired or wireless connection. The wireless interface adapter 120 may operate in accordance with any wireless data communication standards. To communicate with a wireless local area network, standards including IEEE 802.11 a/h/j/n/ac/ax WLAN standards, IEEE 802.15 WPAN standards, WWAN such as 3GPP or 3GPP2, or similar wireless standards may be used. In some aspects of the present disclosure, one wireless interface adapter 120 may operate two or more wireless links. Information handling systems including those that are mobile in embodiments of the present disclosure may employ a plurality of antenna systems for communication via wireless links operating on a variety of radio access technologies (RAT). For example, a mobile information handling system in an embodiment of the present disclosure may employ separate antenna systems for Wi-Fi signals, wireless wide area network (WWAN) signals, Bluetooth signals, and wireless local area network (WLAN) signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, emerging 5G standards, or WiMAX, small cell WWAN, and the like. Wi-Fi and WLAN signals in embodiments of the present disclosure may include wireless links adhering to standards such as, for example, IEEE 802.11 WiFi, IEEE 802.11ad WiGig, IEEE 802.15 WPAN, and IEEE 802.11ax-2021 (e.g., WiFi 6 and 6E, 6GHz technologies). In other aspects, several antenna systems may be available for each RAT to enable aggregated data communications such as via plural multiple in, multiple out (MIMO) streams (e.g., Wi-Fi MIMO or cellular MIMO) to enhance data bandwidth or reliability. In some examples, an information handling system may support multi-RAT radios (4G, 5G, WLAN) that require simultaneous transmission using multiple antennas 148 to support various modes of transmission (e.g., uplink (UL) MIMO and 5G E-UTRAN new radio (EN-DC)). With 5G technology, these information handling systems may use 4×4 sub-6 GHz antennas and 2×2 mmWave antennas, while WLAN supports 2×2 antennas, resulting in a total of 8 antennas, out of which 4 of the WWAN 5G antennas transmit to support EN-DC mode, while 2 of the WLAN antennas concurrently transmit during an UL MIMO operation, totaling to 6 transmit antennas in the information handling system in one example embodiment. Any number of antennas 148 in any arrangement are contemplated in various embodiments.

As described herein, the information handling system 100 may include a display chassis or housing that includes an "a-cover" which serves as a back cover for the display housing and a "b-cover" which may serve as the bezel for a display screen of the information handling system such as a laptop information handling system. In this example embodiment, this laptop information handling system may have a chassis that forms a base housing and includes a "c-cover" housing a keyboard 178, touchpad 172, speaker grill, and any cover in which these components are set and a "d-cover" housing a processing device 102, memory 104, 106, 116, the PMU 118, wireless interface adapter 120 and other components of the information handling system 100 in the base housing for the laptop information handling system. In embodiments described herein, an antenna 148 operatively coupled to the antenna controller 140 via the wireless radio 130 and antenna front end 125 may be in the form of a flexible sheet antenna. In an embodiment, the flexible sheet antenna may include an antenna 148 or a plurality of antennas 148 formed thereon to wirelessly transceive with a network 134 such as a WWAN wireless network, a WLAN wireless network and those other types of networks described herein. The antennas formed on the flexible circuit sheet may be formed thereon as a flexible sheet antenna, for example, using an etching process that results in a flexible circuit having finished, for example, copper conductors on a substrate such as a polyimide, PEEK, a transparent conductive polyester or other suitable types of substrates.

In an embodiment, an antenna 148 formed on the flexible sheet antenna may include a planar inverted-F antenna (PIFA). In this embodiment, the PIFA forms a high band arm on the flexible sheet antenna. In an embodiment, the flexible sheet antenna may include a grounding tape that provides for a grounding source for the flexible sheet antenna.

The antenna 148 formed on the flexible sheet antenna may include any number or type of antennas 148. In an embodiment, the flexible sheet antenna may include a plurality of transceiving arms that transceive at different frequencies. This may allow the information handling system to communicate via a plurality of networks such as a WWAN, WLAN, or other types of networks. In an embodiment, an antenna 148 formed on the flexible sheet antenna may be a planar inverted-F antenna (PIFA) that forms a high-band arm on the flexible sheet antenna. In an embodiment, this high-band antenna (e.g., a high band arm) formed on the flexible sheet antenna may transceive data at frequencies around 600 MHz to 6 GHz such as those frequencies covered by a 5G new radio frequency range 1 (NRFR1). In another embodiment, the PIFA antenna may operate as an LTE antenna transceiving at frequencies at or around 600 MHz to 2.6 GHz.

In an embodiment, the flexible sheet antenna may also include a low-band antenna (e.g., a low-band arm) formed thereon. This low-band antenna may be any type of antenna 148 including for example, a monopole antenna, a dipole antenna, a directional antenna, a patch antenna, a PIFA, a slot antenna, a microstrip antenna, or another suitable antenna. In an embodiment, the low-band antenna of the flexible sheet antenna may transceive at frequencies at or around 600 MHz to 960 MHz. In an embodiment certain mid-band frequencies may also be covered via operation of the PIFA using harmonic frequency resonances in order to transceive at these mid-band frequencies, in an embodiment.

In an embodiment, the flexible sheet antenna may include a grounding tape that provides for a grounding source for the flexible sheet antenna and the antennas formed on the surface of the flexible sheet antenna. In an embodiment, the grounding tape may operatively couple the flexible sheet antenna to a grounding source such as a metal chassis (e.g., portions of the a-cover, the b-cover, the c-cover, or the d-cover).

As described herein, the flexible sheet antenna is wrapped around an antenna holder. The antenna holder may be made of an RF transparent material such as plastic in an embodiment. In an embodiment, the shape of the antenna holder may be such that it the antenna 148 may be placed within a space where one or more interfacing hook structures used to couple a first chassis (e.g., a-cover) of the display chassis to a second chassis (e.g., b-cover or bezel) of the display chassis are formed. In an embodiment, the a-cover may include an edge cavity behind or near these one or more interfacing hook structures where the antenna 148 may be placed. In this embodiment, the size and shape of the antenna holder may be selected such that when the flexible sheet antenna is wrapped around the antenna holder, this formed antenna 148 may be placed within this edge cavity thereby limiting the amount of space that the antenna 148 would have otherwise occupied within the display chassis. This reduces the size (e.g., the thickness) of the display chassis or otherwise allow for additional components to be placed within the display chassis such as a camera device, a sensor, or other hardware that may increase the functionalities of the information handling system 100.

The display chassis of the information handling system 100 may include one or more antennas 148 operatively coupled to a wireless interface adapter 120 including an antenna controller 140 controlling a wireless radio 130. Wireless interface adapter 120 may connect to any combination of macro-cellular wireless connections including 2G, 2.5G, 3G, 4G, 5G or the like from one or more service providers or privately administered network providers via the twice-molded modular antennas and associated systems (e.g., wireless radio 130 and NFC radio 147). Wireless interface adapter 120 may also connect to any WLAN networks such as Wi-Fi networks. Utilization of radiofrequency communication bands according to several example embodiments of the present disclosure may include bands used with the WLAN standards and WWAN carriers, which may operate in both licensed and unlicensed spectrums.

In some embodiments, software executed by a processing device, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 134 may communicate voice, video or data over the network 134. Further, the instructions 124 may be transmitted or received over the network 128 via the network interface device or wireless interface adapter 120.

The information handling system 100 may include a set of instructions 124 that may be executed to cause the information handling system 100 to perform any one or more of the methods or computer-based functions disclosed herein. For example, instructions 124 may be executed by an antenna controller 140 and wireless charging controller 142, and may include software agents, or other aspects or components used to execute the methods and systems described herein. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs. Additionally, execution of the instructions described herein may be via execution of firmware by the antenna controller 140 and/or wireless charging controller 142.

The disk drive unit 116 may include a computer-readable medium 122 in which one or more sets of instructions 124 such as software may be embedded and executed by the antenna controller 140 in an embodiment. Similarly, main memory 104 and static memory 106 may also contain a computer-readable medium for storage of one or more sets of instructions, parameters, or profiles 124 including wireless charging instructions that allow for a user to initiate a wireless communication with a network 134 as described herein. The disk drive unit 116 and static memory 106 may also contain space for data storage. Further, the instructions 124 may embody one or more of the methods or logic as described herein. For example, instructions relating to and executed by the antenna controller 140, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the instructions 124 to be executed by a processor 102 for software applications or the antenna controller 140 may be executed locally, remotely, or a combination thereof. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The computer executable instructions 124 to be executed by the antenna controller 140 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In example embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein is configured as hardware. For example, a portion of an information handling system device 100 may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

As described herein, the information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device 110 or other input/output devices 114 such as the stylus 176, and other components that may require power when a power button has been actuated by a user. In an embodiment, the PMU 118 may monitor power levels and be electrically coupled, either wired or wirelessly, to the information handling system 100 to provide this power and coupled to bus 108 to provide or receive data or instructions. The PMU 118 may be coupled to the antenna controller 140 to control the wireless radio 130 of the information handling system 100 as described herein. The PMU 118 may regulate power from a power source such as a battery 126 or A/C power adapter 128. In an embodiment, the battery 126 may be charged via the A/C power adapter 128 and provide power to the components of the information handling system 100 via a wired connections as applicable, or when A/C power from the A/C power adapter 128 is removed.

The information handling system 100 may include one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize the information handling system 100 on power up, to launch an OS 138, and to manage input and output interactions between the OS 138 and the other elements of information handling system 100. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of the information handling system 100. For example, application programs and BIOS firmware/software 136 can reside in drive 116, in a ROM (not illustrated) associated with the information handling system 100, in an option-ROM (not illustrated) associated with various devices of the information handling system 100, in a storage system (not illustrated) associated with network channel of a wireless interface adapter 120, in another storage medium of the information handling system 100, or a combination thereof. Executable code instructions 124 for application programs and BIOS firmware/software 136 can each be implemented as single programs, or as separate programs carrying out the various features as described herein.

Figure 2:
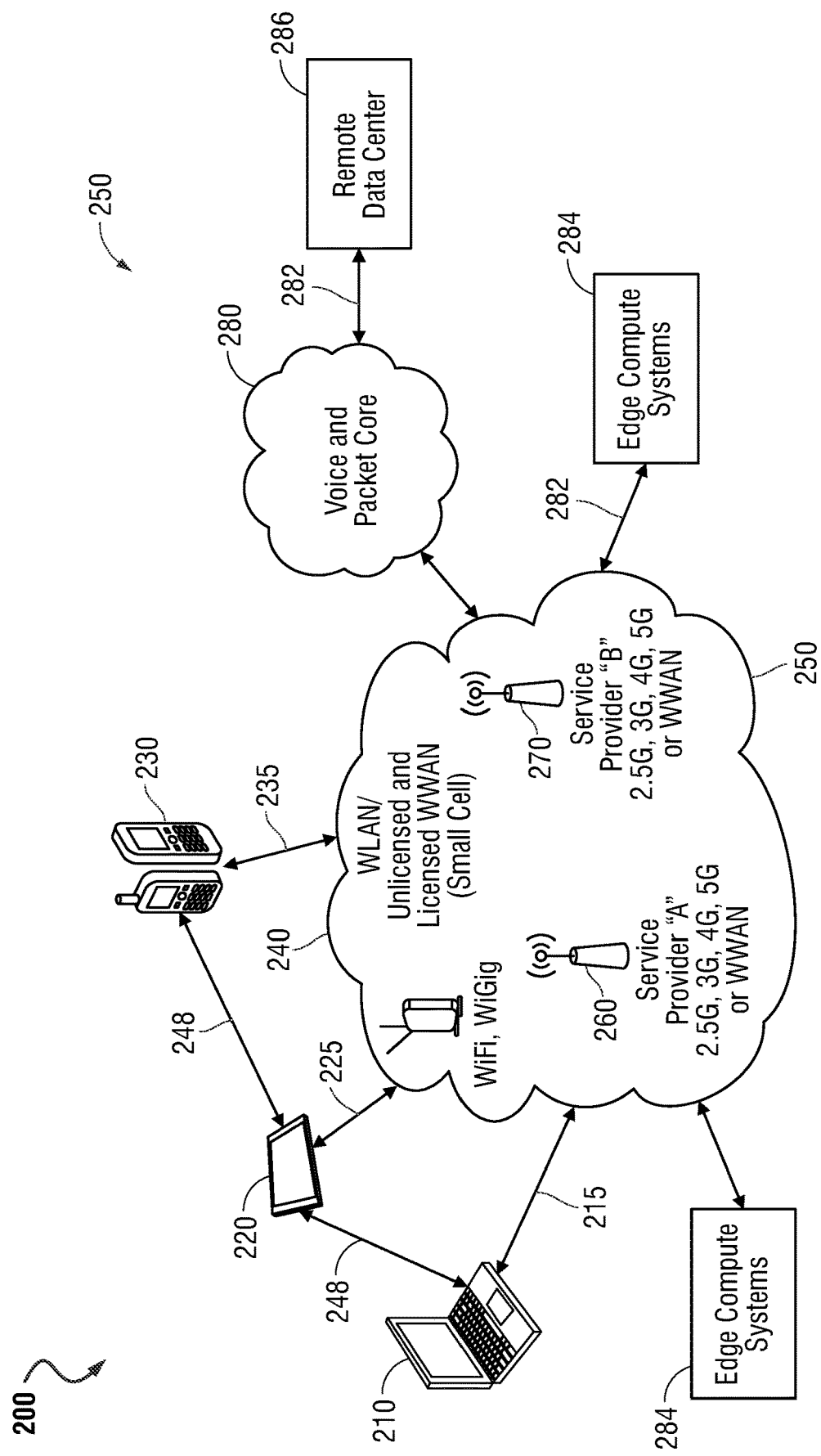
FIG. 2 is a block diagram of a network environment offering several communication protocol options and mobile information handling systems according to an embodiment of the present disclosure.

FIG. 2 illustrates a network 200 that can include one or more endpoint devices 210, 220, 230. The endpoint devices 210, 220, 230 shown in FIG. 2 may be similar to the information handling system 100 described in connection with FIG. 1. In a particular embodiment, network 200 includes networked mobile endpoint devices 210, 220, 230, wireless network access points, and multiple wireless connection link options. A variety of additional computing resources of network 200 may include client mobile information handling systems, data processing servers, network storage devices, local and wide area networks, a RAN service provider, or other resources as needed or desired. As partially depicted, endpoint devices 210, 220, 230 may be a laptop computer, tablet computer, 360-degree convertible systems, wearable computing devices, or a smart phone device. These mobile endpoint devices 210, 220, 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option. In an embodiment, these networks may provide cloud computing resources for the individual mobile endpoint devices 210, 220, 230.

Since WPAN or Wi-Fi Direct connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points or base stations may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6G Hz technologies), or 5G small cell WWAN communications such as gNodeB, eNodeB, or similar and future wireless network protocols and access points. Alternatively, other available wireless links within network 240 may include macro-cellular connections 250 via one or more service providers 260 and 270. The organization of a number of endpoint devices 210, 220, 230 may be defined by the endpoint devices 210, 220, 230 accessing a specific or number of specific base stations. In an embodiment, the endpoint devices 210, 220, 230 may be operatively coupled to any of the macro-cellular connections 250 via one or more service providers 260 and 270 or to the wireless local area networks (WLANs) selectively. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, 3GPP protocols, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. In accordance with several embodiments of the present disclosure, utilization of RF communication bands may include bands used with the WLAN standards and WWAN carriers which may operate in both licensed and unlicensed spectrums. For example, both WLAN and WWAN may use the Unlicensed National Information Infrastructure (U-NII) band which typically operates in the ~5MHz frequency band such as 802.11 a/h/j/n/ac/ax (e.g., center frequencies between 5.170-7.125 GHz). WLAN, for example, may operate at a 2.4 GHz band, 5GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz or, in an embodiment, 960 Mhz. Mid-band 5G may operate at frequencies in an FR1 range between 1.8 and 6 GHz. Additionally, high-band 5G frequencies may operate at 25 to 39 GHz and even higher. In additional examples, WWAN carrier licensed bands may operate at the new radio frequency range 1 (NRFR1), NRFR2, bands, and other known bands as described herein per the operation of the 5G protocol standards for a 5G radio module. Each of these frequencies used to communicate over the network 240 may be based on the radio access network (RAN) standards that implement, for example, eNodeB or gNodeB hardware connected to mobile phone networks (e.g., cellular networks) used to communicate with the endpoint devices 210, 220, 230. In the example embodiment, mobile endpoint devices 210, 220, 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the endpoint devices 210, 220, 230 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile endpoint device 210, 220, 230 may each have a plurality of wireless network interface systems or radio protocol subsystems capable of transmitting simultaneously within several communication bands or even utilizing a shared communication frequency band access multiple protocols. In an embodiment, one or more of these wireless network interface systems or radio protocol subsystems may include the flexible sheet antenna as wrapped around an antenna holder described herein that may fit within a cavity formed in one of the a-cover or b-cover (or both) at an edge cavity of each endpoint device 210, 220, 230. Communication within a shared communication frequency band may be sourced from different protocols on parallel wireless network interface systems or from a single wireless network interface system capable of transmitting and receiving from multiple protocols. Similarly, a single antenna or the plurality of antennas in each endpoint device 210, 220, 230 may be used on each of the wireless communication devices such as according to embodiments herein and may be suited to plural RF bands. As described herein, each of the endpoint devices 210, 220, 230 may include a 5G antenna that are capable of transmitting and receiving data using an FR1 and FR2 frequency concurrently to communicate with multiple networks. Example competing protocols may be local wireless network access protocols such as Wi-Fi/WLAN, WiGig, and small cell WWAN in an unlicensed, shared communication frequency band. Within local portion of wireless network 250 access points for Wi-Fi or WiGig as well as small cell WWAN connectivity may be available in 5G technology or emerging 6G technology. This may create situations where a plurality of antenna systems are operating on an endpoint device 210, 220, 230 via concurrent communication wireless links on both WLAN and WWAN radios and antenna systems. In some embodiments, concurrent wireless links may operate within the same, adjacent, or otherwise interfering communication frequency bands. The antenna may be a transmitting antenna that includes high-band, medium-band, low-band, and unlicensed band transmitting antennas or antenna arms in embodiments herein. The antenna may cooperate with other antennas in a NxN MIMO (where "N" is any number) array configuration according to the embodiments described herein. Alternatively, embodiments may include a single transceiving antenna capable of receiving and transmitting, and/or more than one transceiving antennas. Each of the antennas included in the endpoint devices 210, 220, 230 in an embodiment may be subject to the FCC regulations on specific absorption rate (SAR).

The voice and packet core network 280 shown in FIG. 2 may contain externally accessible computing resources such as containerize applications that may execute at edge compute resources at the edge compute systems 284 or connect to a remote data center 286. The voice and packet core network 280 may contain multiple intermediate web servers or other locations with accessible data (not shown). The voice and packet core network 280 may also connect to other wireless networks similar to 240 or 250 and additional mobile endpoint devices 210, 220, 230 or similar connected to those additional wireless networks. Connection 282 between the wireless network 240 and edge compute resources at the edge compute systems 284 or remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and includes a backhaul connection. The access point may be connected to one or more wireless access points in the WLAN before connecting directly to a mobile information handling system or may connect directly to one or more mobile endpoint devices 210, 220, 230. Alternatively, mobile endpoint devices 210, 220, 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers 286 can include additional information handling systems, data processing servers, network storage devices, local and wide area networks, or other resources as needed or desired. In an embodiment, the remote data center 286 may include one or more servers.

Edge compute systems 284, in an embodiment, may be used to offload processing requirements for each of the mobile endpoint devices 210, 220, 230 described herein. In this embodiment, the edge compute systems 284 may be any computing system or distributed computing systems that places the processing and data storage resources within the network 240 and 250 closer to the mobile endpoint devices 210, 220, 230 to improve response times and save bandwidth while offloading processing of data from the mobile endpoint devices 210, 220, 230 to these edge compute systems 284. In an embodiment, containerized software applications may be executed on the edge compute systems 284 as a bundle of application code, configuration files, libraries, and dependencies used to execute those containerized software applications. During operation of the mobile endpoint devices 210, 220, 230, any applicable containerized software application may be accessed by the respective processing devices in the mobile endpoint devices 210, 220, 230.

Having such edge compute or remote capabilities may permit fewer resources to be maintained at the mobile endpoint devices 210, 220, 230 allowing streamlining and efficiency within those devices. Similarly, remote data center permits fewer resources to be maintained in other parts of network 200. Thus, high data bandwidth wireless links are desired for endpoint devices 210, 220, 230 to interface with greater and greater resources located on a network edge or as a remote data center.

Although network connections 215, 225, and 235 are shown connecting wireless adapters of mobile endpoint devices 210, 220, 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile endpoint devices 210, 220, 230 may communicate intra-device via intra-device connections 248 when one or more of the mobile endpoint devices 210, 220, 230 are set to act as an access point or even potentially an WWAN connection via small cell communication on licensed or unlicensed WWAN connections. For example, one of the endpoint devices 210, 220, 230 may serve as a Wi-Fi hotspot in an embodiment. Concurrent wireless links to the endpoint devices 210, 220, 230 may be connected via any access points including other mobile information handling systems as illustrated in FIG. 2.

Figure 3:
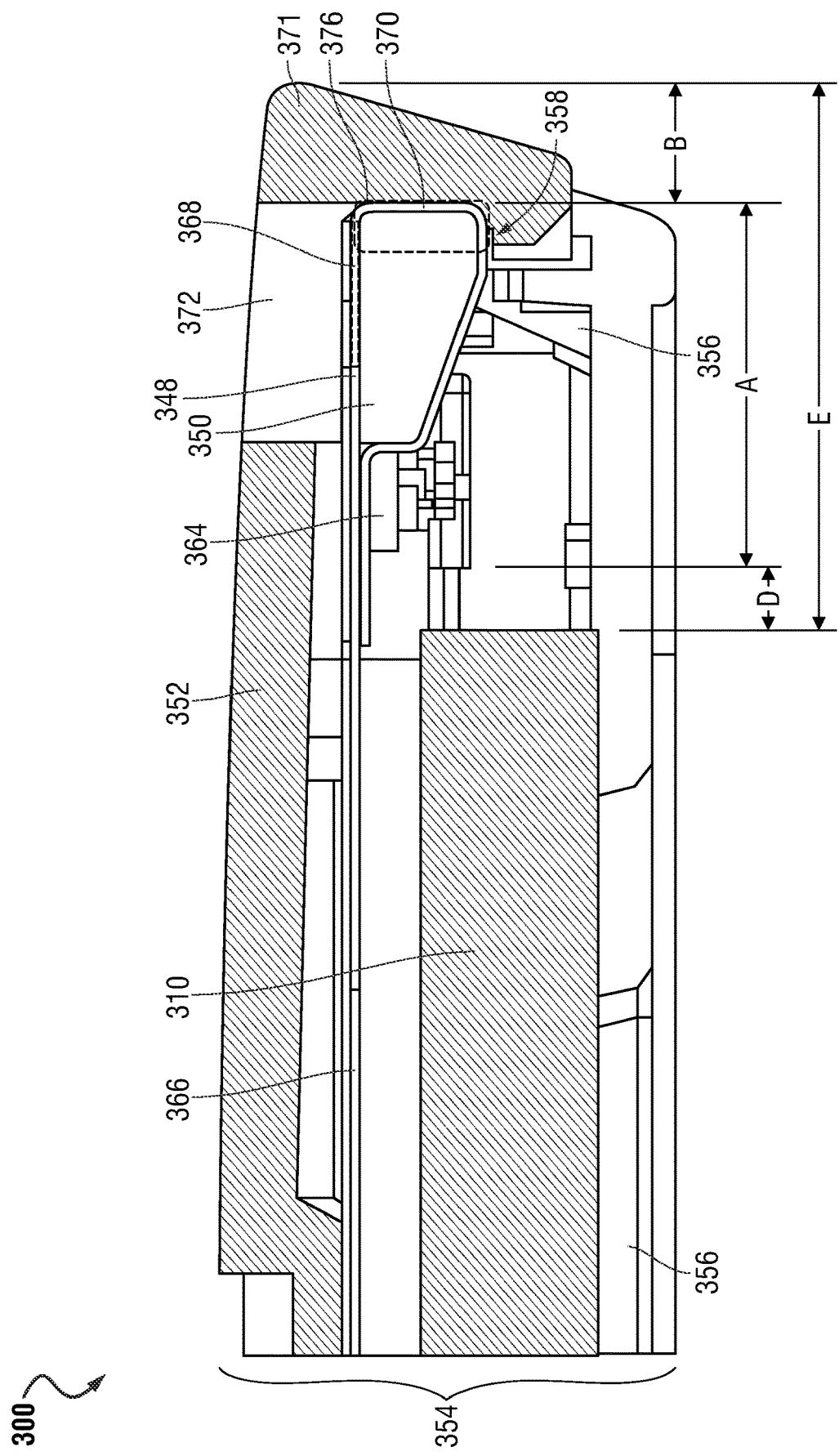
FIG. 3 is a graphic, cross sectional, view of a flexible sheet antenna and an antenna holder in a display chassis of an information handling system according to an embodiment of the present disclosure.

FIG. 3 is a graphic, cross sectional, view of a flexible sheet antenna 348 and an antenna holder 350 in a display chassis 354 of an information handling system 300 according to an embodiment of the present disclosure. As described herein, the display chassis 354 may include a first chassis cover portion such as an a-cover 352 and a second chassis cover portion such as a b-cover 356. As described herein, the information handling system 300 may include a display chassis 354 that includes a second chassis cover portion or b-cover 356 secured to a first chassis cover portion or an a-cover 352 via one or more interfacing hook structures 358. These interfacing hook structures 358 may be formed along outside edges of both the a-cover 352 and b-cover 356 at matching locations so that these interfacing hook structures 358 may interface with each other when the b-cover 356 is installed onto the a-cover 352. For example, the a-cover 352 is a back cover of a display chassis 354 for an information handling system 300. The b-cover 356 is an edge bezel of a display chassis 354 for an information handling system 300 in an embodiment.

As described herein, the display chassis 354 may house a number of hardware components along with the flexible sheet antenna 348 in an embodiment. In an embodiment, the display chassis 354 includes a camera (not shown) such as a web-cam. In this embodiment, the camera may be placed at a top portion of the display chassis 354 where the flexible sheet antenna 348 has also been placed. In this example embodiment, the flexible sheet antenna 348 may be placed on a side of the camera and at the top of the display chassis 354. In an embodiment, the display chassis 354 may house a video/graphics display device 310. In this example, the video/graphics display device 310 may include a flat panel display and may also serve as an input device in those embodiments where the video/graphics display device 310 is a touch display device.

In an embodiment, the flexible sheet antenna 348 may include an antenna or a plurality of antennas formed in the display chassis 354 to wirelessly transceive with a network such as a WWAN wireless network, a WLAN wireless network and those other types of networks described herein. In an embodiment, an antenna formed on the flexible sheet antenna may include a PIFA. In this embodiment, the PIFA forms a high-band arm at location 368 on the flexible sheet antenna 348. In an embodiment, the flexible sheet antenna 348 may include a grounding tape 366 that provides for a grounding source for the flexible sheet antenna.

The antenna formed on the flexible sheet antenna may include any number or type of antennas. In an embodiment, the flexible sheet antenna 348 may include a plurality of transceiving arms that transceive at different frequencies. This may allow the information handling system to communicate via a plurality of networks such as a WWAN, WLAN, or other types of networks. In an embodiment, an antenna formed on the flexible sheet antenna may be a planar inverted-F antenna (PIFA) that forms a high-band arm on the flexible sheet antenna. In an embodiment, this high-band antenna (e.g., a high band arm) formed on the flexible sheet antenna may transceive data at frequencies around 600 MHz to 6 GHz such as those frequencies covered by a 5G new radio frequency range 1 (NRFR1). In another embodiment, the PIFA antenna may operate as an LTE antenna transceiving at frequencies at or around 600 MHz to 2.6 GHz.

In an embodiment, the flexible sheet antenna may also include a low-band arm at location 370 of the PIFA formed thereon. This low-band arm at location 370 of the flexible sheet antenna 348 may be any type of antenna including for example, a monopole antenna, a dipole antenna, a directional antenna, a patch antenna, a slot antenna, a microstrip antenna, or another suitable antenna. In an embodiment, the low-band arm at location 370 of the flexible sheet antenna 348 may transceive at frequencies at or around 600 MHz to 960 MHz. In an embodiment certain mid-band frequencies may be covered via operation of the PIFA (e.g., high-band arm 368) using harmonic frequency resonances in order to transceive at these mid-band frequencies thereby covering those bands between the low-band arm at location 370 and the high-band arm 368 of the flexible sheet antenna 348 in an embodiment.

In an embodiment, the flexible sheet antenna 348 may include a grounding tape 366 that provides for a grounding source for the flexible sheet antenna 348 and the antennas formed at a terminal end of the flexible sheet antenna 348 as shown in FIG. 3. In an embodiment, the grounding tape 366 may operatively couple the flexible sheet antenna 348 to a grounding source such as a metal chassis (e.g., portions of the a-cover 352, the b-cover 356, the c-cover (not shown), or the d-cover (not shown)).

As described herein, the flexible sheet antenna 348 is wrapped around an antenna holder 350. The antenna holder 350 may be made of an RF transparent material such as plastic in an embodiment. In an embodiment, the shape of the antenna holder 350 may be such that the flexible sheet antenna 348 is placed within an edge cavity at an edge cavity location 376 in an outer edge portion 371 of a display chassis, that edge cavity location 376 is internal to but along the outer edge portion 371 of the display chassis 354 where the one or more interfacing hook structures 358 of the display chassis are formed. In an embodiment, the a-cover 352 may include an edge space portion behind or near these one or more interfacing hook structures 358 where the flexible sheet antenna 348 may be placed into the edge cavity location 376. In this embodiment, the size and shape of the antenna holder 350 may be selected such that when the flexible sheet antenna 348 is wrapped around the antenna holder 350, the resulting formed flexible sheet antenna 348 may be placed within this edge cavity thereby limiting the amount of space that the flexible sheet antenna 348 would have otherwise occupied within the display chassis 354. This reduces the size (e.g., the thickness) of the display chassis 354 or otherwise allow for additional components to be placed within the display chassis 354 such as a camera device (not shown), a sensor (not shown), or other hardware that may increase the functionalities of the information handling system 100. In the example embodiment shown in FIG. 3, the shape of the antenna holder 350 is an irregular, pentagonal prism that has a length that runs along a top portion the display chassis 354. In other embodiments the antenna holder 350 may be any shape prism or cylindrical, ovular, or other shape around which the flexible sheet antenna 348 may be mounted. In the embodiments herein, the antenna holder 350 is shaped to fit within the edge cavity location 376 when the flexible sheet antenna 348 is wrapped around the antenna holder 350. In an embodiment, an interference fit may be made between the antenna holder 350/flexible sheet antenna 348 and the inner edges of the edge cavity location 376 such that the antenna holder 350/flexible sheet antenna 348 are not dislodged during use of the information handling system 300.

In an embodiment, the flexible sheet antenna 348 may be operatively coupled to a printed circuit board (PCB) 364. In an embodiment, the PCB 364 may provide for a location where an antenna front and may be placed. In an embodiment, the antenna front end (e.g., antenna front end 125, FIG. 1) may include tuning circuitry that allows an antenna controller to, via a wireless radio, operate at the frequencies at which the flexible sheet antenna 348 transceives and to support one or more wireless radio protocols as described herein. Other circuitry may be included on the PCB 364 such as an amplifier, a low pass filter, and a high-pas filter, among other circuitry. In some embodiments, the PCB 364 may further include an antenna controller and a wireless radio that may otherwise have been included as hardware within the base chassis (e.g., the c-cover and d-cover chassis) of the information handling system 300. In an embodiment, the PCB 364 may be mounted on the antenna holder 350

In an embodiment, the use of the flexible sheet antenna 348 as described herein reduces the dimensions of the antenna systems from those that may otherwise be placed in the display chassis. This creates a larger space within the display chassis 354 for other hardware or for, for example, a relatively larger video/graphics display device 310 or for a thinner bezel design of display chassis 354. For example, the total antenna depth (e.g., distance "A" in FIG. 3) of the flexible sheet antenna 348 may be as short as about 5.5 mm where a total antenna depth of a legacy antenna may be as long as 6.0 mm or more. Further, the front edge radiating element 370 may be moved closer into the outer edge portion 371 of the display chassis or A cover (e.g., a shorter length "B" in FIG. 3 may be as short as about 2.34 mm whereas a legacy antenna system may have a front edge radiation element displacement from an outside edge of the display chassis as long as 5 mm. It is contemplated that the outer edge portion 371 of the display chassis is a part of the A cover in the shown embodiment or is part of the b-cover 356 in other embodiments not shown. Further, the outer edge portion 371 is part of the antenna window and comprised of a radiofrequency transparent material for the front edge radiation element 370 in some embodiments. Additionally, a length of gap (e.g., length "D" in FIG. 3) from the flexible sheet antenna 348 and to the edge of the video/graphics display device 310 may be a short as 0.75 mm since the low band front edge radiation element 370 may be located further from the video/graphics display device 310 as well as any metallic portion of the a-cover 352 and into the radio frequency transparent outer edge portion 371 of the display chassis. With these lengths, the length of the bezel of b cover 356 antenna window from the edge of the video/graphics display device 310 to a top, outer edge of the a-cover 352 (e.g., length "C", FIG. 3) is around 10.69 mm. Thus, the flexible sheet antenna 348 and antenna holder of the embodiments of the present disclosure may be fitted further into the outer edge of the display chassis (e.g., a-cover in the shown embodiment) and enable a shorter length and narrower b cover 356 bezel length "C" than available in legacy antenna systems.

In an embodiment, the a-cover 352 of the display chassis 354 includes a radio frequency (RF) transparent window 372. The RF transparent window 372 may be made of any RF transparent material such as a plastic and may be any dimension relative to flexible sheet antenna 348 to facilitate wireless operation of the flexible sheet antenna 348. In an embodiment, the RF transparent window 372 may be colored, textured, or otherwise visually changed to match the color and texture of other portions of the a-cover 352 of the display chassis 354. This may increase the aesthetics of the information handling system 300 as well as improve operation of some or all of the flexible sheet antenna 348. In an embodiment, a plurality of RF transparent windows 372 may be formed into a portion of the a-cover 352 of the display chassis 354. In an embodiment, a RF transparent window 372 may be formed into the a-cover 352 of the display chassis 354 so that each of the high-band arm at location 368 and the low-band arm at location 370 of the flexible sheet antenna 348 may transceive data through the a-cover 352. In an embodiment, two RF transparent windows similar to window 372 (not shown) may be formed into the a-cover 352 of the display chassis 354 with a first RF transparent window used to allow for transception by the high-band arm and corresponding to location 368 and a second RF transparent window for the transception of the low-band arm and corresponding to location 370. In an embodiment, a single RF transparent window 372 may be formed around a top edge of the a-cover 352 of the display chassis 354 allowing for transception via both of the high-band arm at location 368 and low-band arm at location 370 via this single RF transparent window 372. The placement of the high-band arm at location 368 allows the high-band arm to transceive through the RF transparent window 372, the antenna holder 350, outer edge element 371, as well as through the plastic portions of the edge of the b-cover 356. Indeed, by placing the flexible sheet antenna 348 around the antenna holder 350 and into the edge cavity location 376, both arms of the, for example, PIFA antenna may transmit out from the top, outer edge element 371 of a display chassis 354 of the information handling system 300 because they have been offset from the display device 310.

Figure 4:
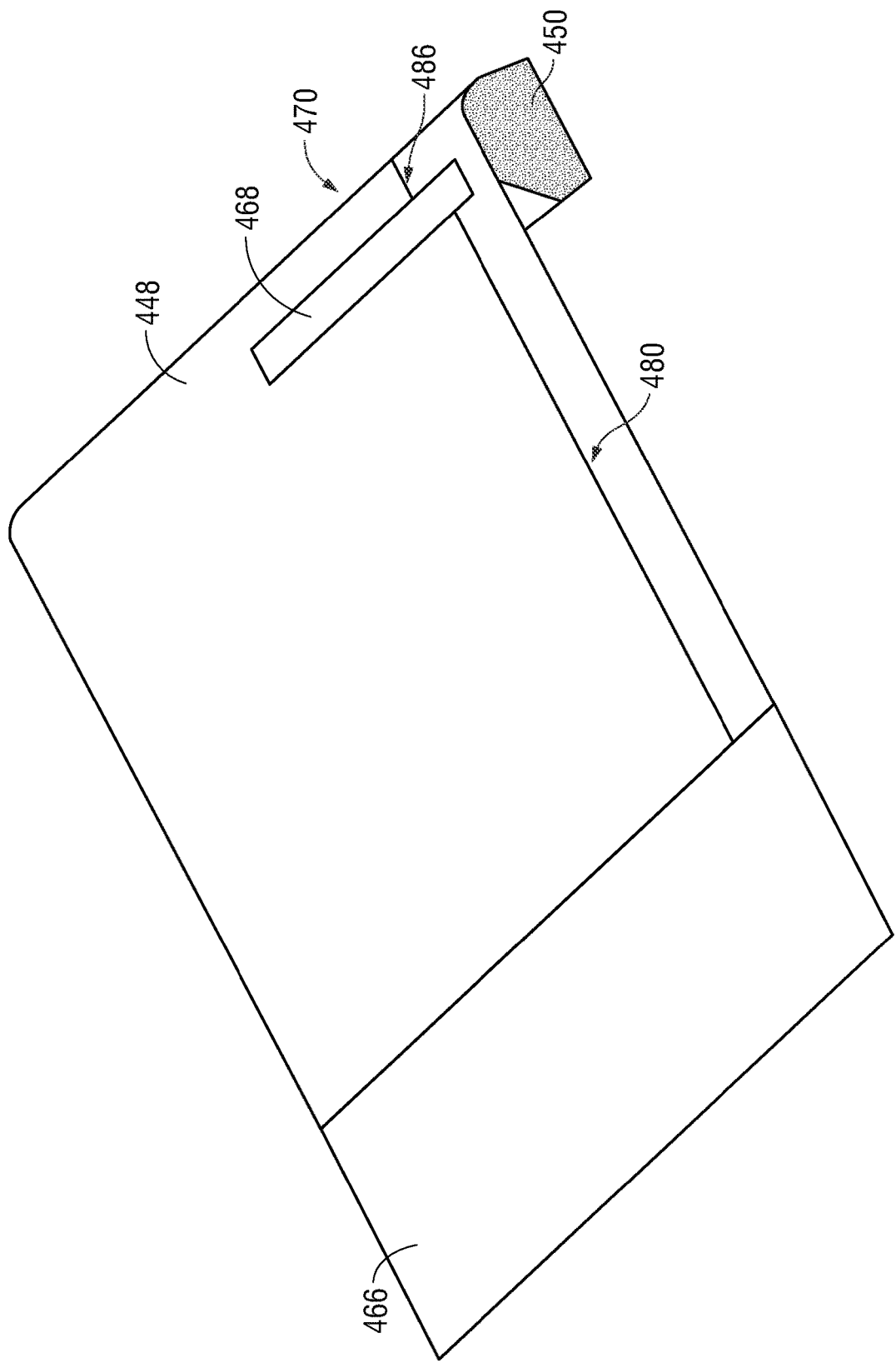
FIG. 4 is a perspective view of a high-band arm antenna structure formed on a flexible sheet circuit wrapped around an antenna holder according to an embodiment of the present disclosure.

FIG. 4 is a perspective view of a high-band arm antenna structure 468 formed on a flexible sheet circuit 448 wrapped around an antenna holder 450 according to an embodiment of the present disclosure. As described herein a flexible sheet antenna, according to an embodiment, may include a high-band arm antenna structure 468 and a low-band arm antenna structure (not shown, but indicated by 470 on a non-viewable side of the flexible sheet antenna 448) used to transceive at different frequencies. In an embodiment, the high-band arm antenna structure 468 along with the low-band arm 470 as linked by the line 486 in the flexible sheet circuit 448 may be a PIFA. In this embodiment, the PIFA forms a high-band arm 468 on the flexible sheet circuit 448 that runs along an exterior side of a chassis portion such as the a-cover of the display chassis and the low-band arm 470 along the outer edge of the display chassis as described above with FIG. 3 (e.g., fitted into cavity 376 of outer edge portion 371 of the display chassis).

The PIFA example of the high-band arm antenna structure 468 shown in FIG. 4 may include an excitation patch structure. The excitation patch structure receives an excitation signal from a feed pin operatively coupled to an excitation source such as a PCB (not shown) housing an antenna front end and a radio among other circuitry used to create, amplify, modify, or generate the signal. In an embodiment, the excitation patch structure may printed on the flexible sheet antenna 448. In an embodiment, the antenna structure 468 of the low-band arm of the PIFA antenna may be operatively coupled to ground tape 466 via a grounding line 480.

In an embodiment, this PIFA-type high-band arm antenna structure 468 formed on the flexible sheet antenna may transceive data at frequencies around 600 MHz to 6 GHz such as those frequencies covered by a 5G new radio frequency range 1 (NRFR1). In another embodiment, the PIFA-type high-band arm antenna structure 468 may operate as an LTE antenna transceiving at frequencies at or around 600 MHz to 2.6 GHz.

Figure 5:
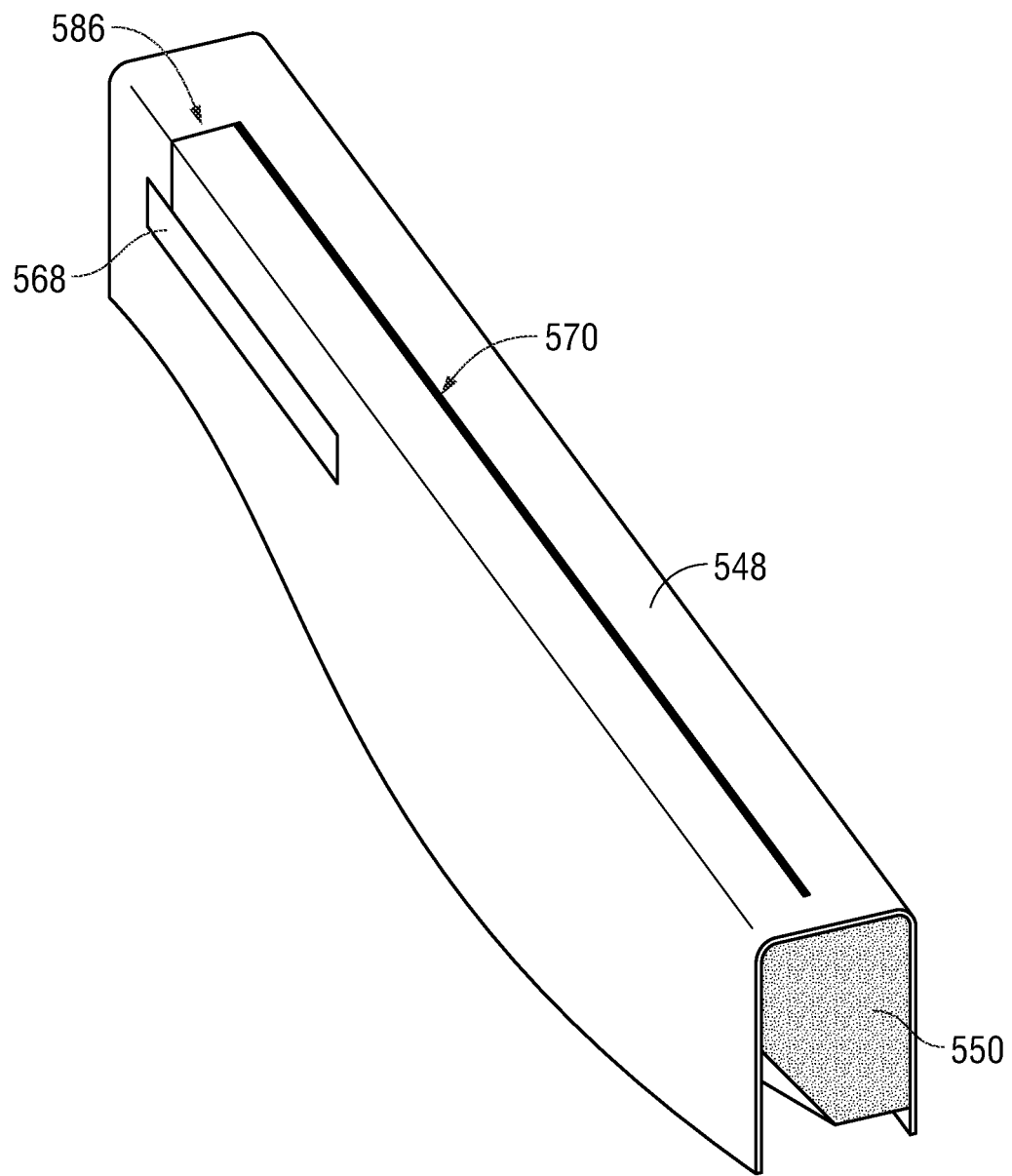
FIG. 5 is a perspective view of a low-band arm antenna structure formed on a flexible sheet circuit wrapped around an antenna holder according to an embodiment of the present disclosure.

FIG. 5 is a perspective view of a low-band arm antenna structure 570 formed on a flexible sheet circuit 548 wrapped around an antenna holder 550 according to an embodiment of the present disclosure. As described herein, this low-band arm antenna structure 570 forms a second arm of, for example, a PIFA on the flexible sheet circuit 548 to transceive at a different frequency than the high-band arm antenna structure 468 shown in FIG. 4. In the embodiment of FIG. 5, the low-band arm antenna structure 570 may include a monopole antenna operative coupled to an excitation source (not shown) via an excitation lead 586 formed on the flexible sheet circuit 548.

This mono-pole-type low-band arm antenna structure or a low-band portion 570 of a PIFA antenna may be just some examples of the type of antenna implemented as the second arm antenna on the low-band arm antenna structure 570. Indeed, any type of antenna including for example, a monopole antenna, a dipole antenna, a directional antenna, a patch antenna, a slot antenna, a microstrip antenna, or another suitable antenna may be used and formed on the flexible sheet circuit 548 shown in FIG. 5. In an embodiment, low-band arm antenna structure 570 of the flexible sheet antenna may transceive at frequencies at or around 600 MHz to 960 MHz. In an embodiment certain mid-band frequencies may be covered via operation of the antenna using harmonic frequency resonances in order to transceive at these mid-band frequencies, in an embodiment.

Figure 6:
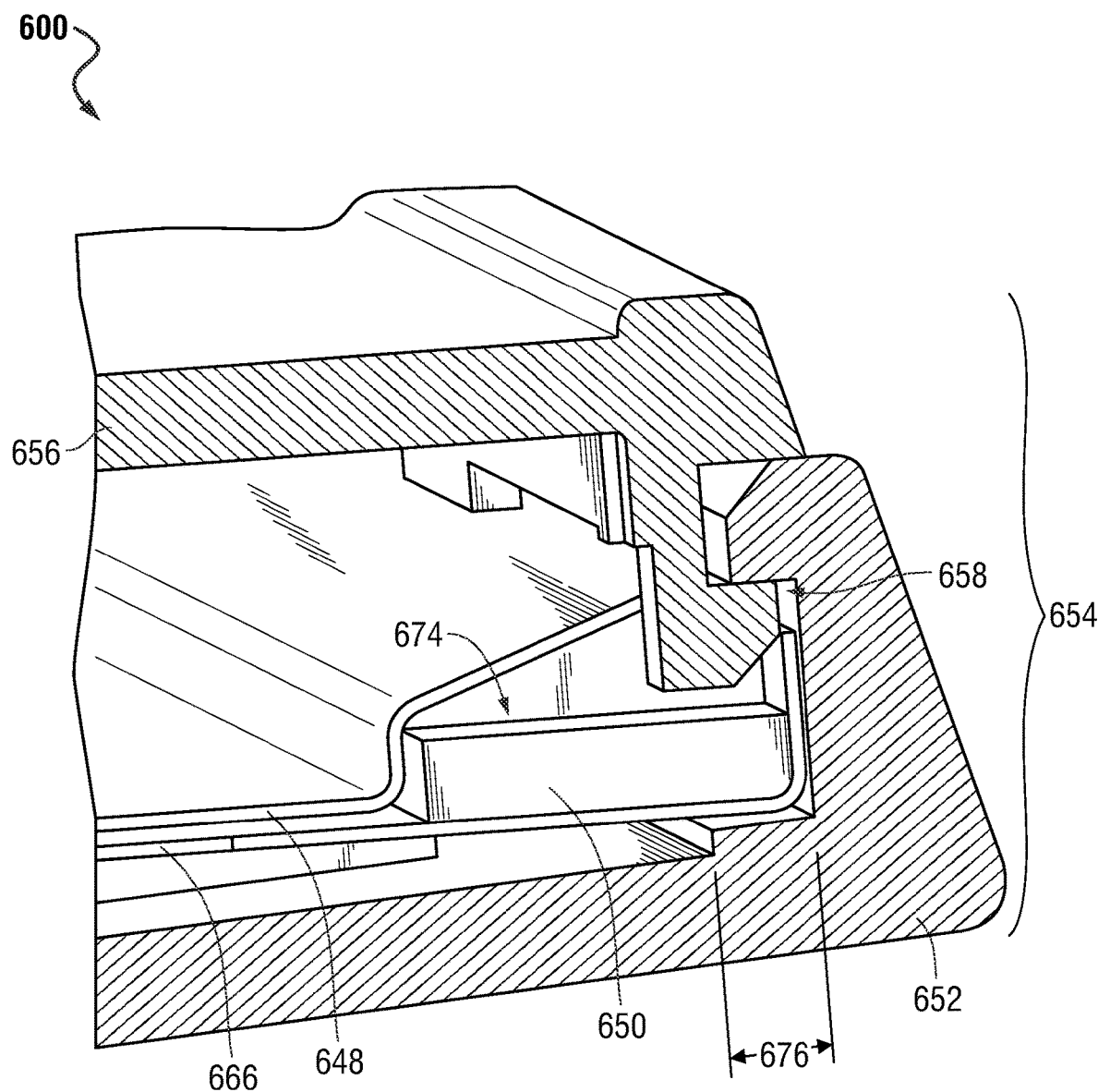
FIG. 6 is a graphic, cross sectional, perspective view of a flexible sheet antenna and an antenna holder in a display chassis of an information handling system according to an embodiment of the present disclosure.

FIG. 6 is a graphic, cross sectional, perspective view of a flexible sheet antenna 648 and an antenna holder 650 in a display chassis 654 of information handling system of according to an embodiment of the present disclosure. As described herein, the flexible sheet antenna 648 may be wrapped around an antenna holder 650 and placed, at least partially, within an edge cavity 676 along an outer edge of the display chassis 654 formed, in this example embodiment shown in FIG. 6, into the a-cover 652 of the display chassis 654. In an embodiment, the width of the edge space portion of edge cavity 676 may be around 0.7 mm. In an embodiment, the size and shape of the antenna holder 650 may be selected such that when the flexible sheet antenna 648 is wrapped around the antenna holder 650, this formed antenna may be placed or fitted within this edge space portion of edge cavity 676 thereby limiting the amount of space that the antenna would have otherwise occupied within the display chassis 654. This utilizes previously unused space at the edges of the display chassis 654 such as in recessed portion 676 and reduces the size (e.g., the thickness) of the display chassis 654 or otherwise allows space for additional components to be placed within the display chassis 654 such as a camera device, a sensor, or other hardware that may increase the functionalities of the information handling system 600 or efficiency of usage of chassis space.

As described herein, the flexible sheet antenna 648 shares space with one or more interfacing hook structures 658 formed between the a-cover 652 or first portion and the b-cover 656 or second portion of the display chassis 654. In an embodiment, the interfacing hook structures 658 may include interfacing shelves formed into the outer edges of the a-cover 652 and b-cover 656. The a-cover 652 or first portion of display chassis 654 is a back cover in an embodiment. The b-cover 656 or second portion of the display chassis 654 is an edge bezel cover in an embodiment. In an embodiment, these interfacing shelves may be distributed around the outer edges of the a-cover 652 and b-cover 656 to secure these outer edges together during assembly of the display chassis 654. In the embodiment shown in FIG. 6, the interfacing hook structures 658 formed along the outer edges of the b-cover 656 may extend into a portion of the antenna holder 650 at an antenna holder recess 674. The antenna holder recess 674 may be formed at locations along a length of the antenna holder 650 where the interfacing hook structures 658 are formed on the b-cover 656. In an embodiment, the flexible sheet antenna 648 wrapped around the antenna holder 650 may be cut or otherwise removed at those locations where the interfacing hook structures 658 are formed on the b-cover 656 so that the interfacing hook structures 658 may be set into the antenna holder recess 674 formed in the antenna holder 650.

In an embodiment, the flexible sheet antenna disposed at location 648 may include a grounding tape 666 that provides for a grounding source for the flexible sheet antenna and the antennas formed at a terminal end of the flexible sheet antenna 648 as shown in FIG. 6. In an embodiment, the grounding tape 666 may operatively couple the flexible sheet antenna 648 to a grounding source such as a metal chassis (e.g., portions of the a-cover 652, the b-cover 656, the c-cover (not shown), or the d-cover (not shown)).

Figure 7:
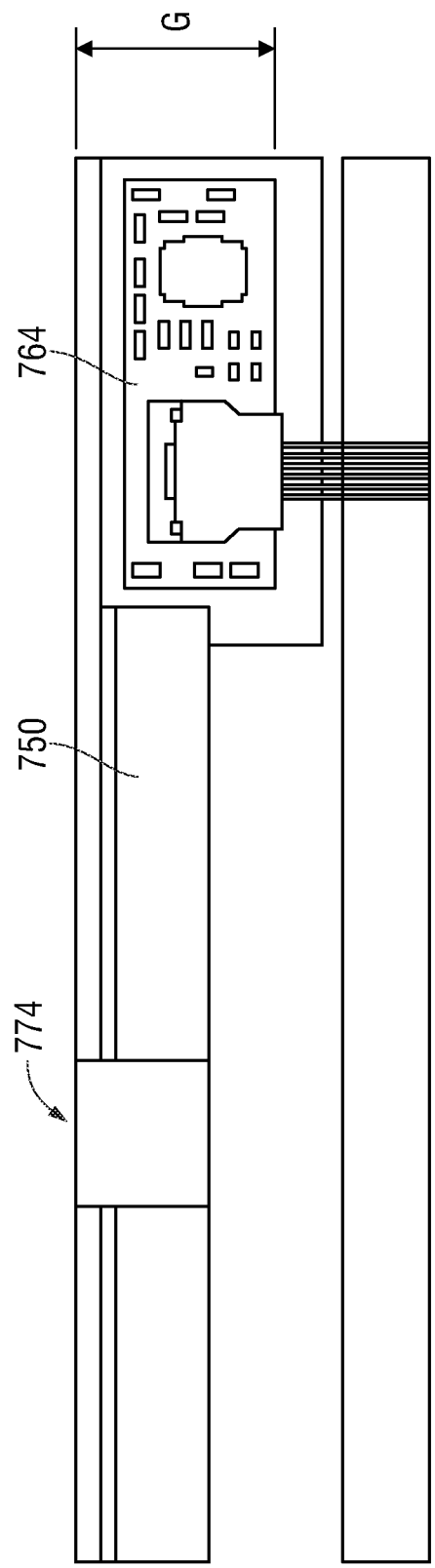
FIG. 7 is a front view of an antenna holder and a printed circuit board according to another embodiment of the present disclosure.

FIG. 7 is a front view of an antenna holder 750 and a printed circuit board (PCB) 764 according to another embodiment of the present disclosure. FIG. 7 shows an antenna holder 750 with a flexible sheet antenna removed for viewing of the antenna holder 750. The antenna holder 750 may extend along a top of the display chassis of the information handling system. The flexible sheet antenna wrapped around the antenna holder 750 when assembled may be customized to transceive at specific frequencies as described herein. In an example embodiment, the antenna formed on the flexible sheet antenna may include any number or type of antenna. In an embodiment, the flexible sheet antenna may include a plurality of transceiving arms that transceive at different frequencies. This may allow the information handling system to communicate via a plurality of networks such as a WWAN, WLAN, or other types of networks. In an embodiment, an antenna may be formed on the flexible sheet antenna. In this embodiment, this antenna may be a planar inverted-F antenna (PIFA) that forms a high-band arm on the flexible sheet antenna. In an embodiment, this high-band antenna (e.g., a high band arm) formed on the flexible sheet antenna may transceive data at frequencies around 600 MHz to 6 GHz such as those frequencies covered by a 5G NRFR1. In another embodiment, the PIFA antenna may operate as an LTE antenna transceiving at frequencies at or around 600 MHz to 2.6 GHz.

In another embodiment, the flexible sheet antenna may also include a low-band antenna (e.g., a low-band arm) formed thereon. This low-band antenna may be any type of antenna including for example, a monopole antenna, a dipole antenna, a directional antenna, a patch antenna, a PIFA, a slot antenna, a microstrip antenna, or another suitable antenna. In an embodiment, the low-band antenna of the flexible sheet antenna may transceive at frequencies at or around 600 MHz to 960 MHz. In an embodiment certain mid-band frequencies may be covered via operation of the high-band PIFA using harmonic frequency resonances in order to transceive at these mid-band frequencies concurrent with the operation of the low-band arm, in an embodiment.

In an embodiment, a printed circuit board (PCB) 764 may be operatively coupled to the antenna holder 750 in an embodiment. In the embodiment shown in FIG. 7, the PCB 764 may be operatively coupled to the flexible sheet antenna when the flexible sheet antenna is installed. In an embodiment, the PCB 764 may provide for a location where an antenna front and may be placed. In an embodiment, the antenna front end (e.g., antenna front end 125, FIG. 1) may include tuning circuitry that allows an antenna controller to, via a wireless radio, tune the frequencies at which the flexible sheet antenna transceives at. Additional circuitry may be included on the PCB 764 such as an amplifier, a low pass filter, and a high-pas filter, among other circuitry. In an embodiment, the PCB 764 may further include an antenna controller and a wireless radio that may otherwise have been included as hardware within the base chassis (e.g., the c-cover and d-cover chassis) of the information handling system.

In an embodiment, the PCB 764 may be situated along the surface of the antenna holder 750. The PCB 764 may be at any location at the edge of display chassis (or elsewhere in display chassis) and operatively coupled to the flexible antenna sheet in other embodiments. In an embodiment, the PCB 764 may be formed into a portion of the antenna holder 750. In another embodiment, the PCB may be affixed to a portion of the a-chassis and operatively coupled to the flexible sheet antenna when installed. The placement of the PCB 764 may be such that the dimensions of the flexible sheet antenna are not significantly increased. In an embodiment, the distance "G" from the outer edge of the flexible sheet antenna to the bottom of the PCB 764 may be about 5.5 mm.

As described herein, the interfacing hook structures (not shown) formed along the outer edges of the b-cover may extend into a portion of the antenna holder 750 at an antenna holder recess 774. The antenna holder recess 774 may be formed at locations along a length of the antenna holder 750 where the interfacing hook structures are formed on the b-cover. In an embodiment, the flexible sheet antenna wrapped around the antenna holder 750 may be cut or otherwise removed at those locations where the interfacing hook structures are formed on the b-cover so that the interfacing hook structures may be set into the antenna holder recess 774 formed in the antenna holder 750.

Figure 8:
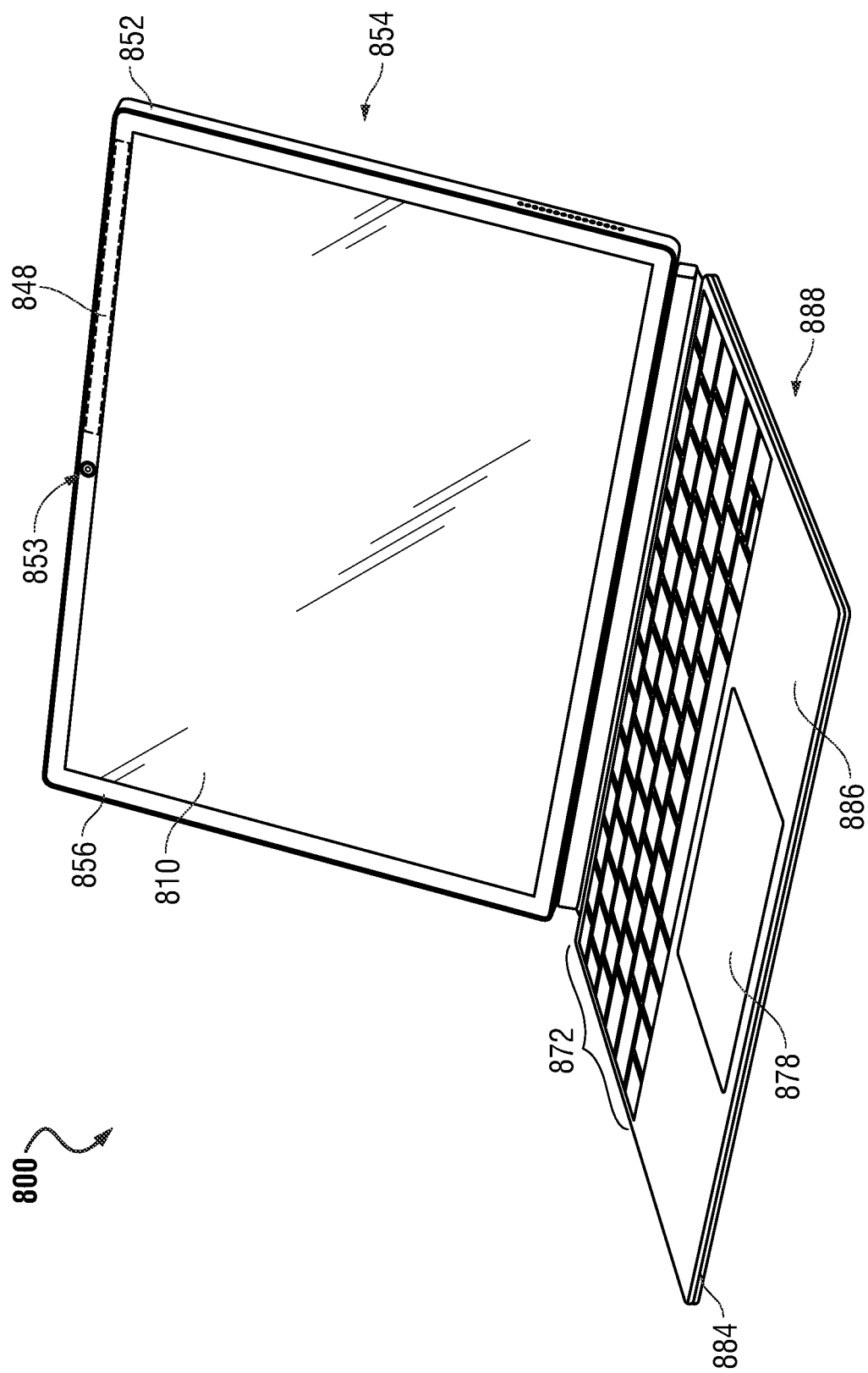
FIG. 8 is a graphic perspective view of an information handling system indicating a location of a flexible sheet antenna according to another embodiment of the present disclosure.

FIG. 8 is a graphic perspective view of an information handling system 800 indicating a location of a flexible sheet antenna 848 according to another embodiment of the present disclosure. In the embodiment shown in FIG. 8, the information handling system 800 is a laptop-type information handling system that includes a display chassis 854 and a base chassis 888. As described herein, the base chassis 888 includes a c-cover 886 housing a keyboard 872, touchpad 878, speaker grill (not shown), and any cover in which these components are set. The base chassis 888 also includes a d-cover 884 housing one or more processing devices, memory, the PMU, wireless interface adapter and other components of the information handling system 800 in the base chassis 888 for the laptop-type information handling system 800. In an embodiment, the chassis of the information handling system 800 may include a display chassis 854 that includes an a-cover 852 which serves as a back cover for the display chassis 854. In an embodiment, the display chassis 854 further includes a b-cover 856 which may serve as the bezel for a video/graphics display device 810 of the information handling system 800.

As described herein, the display chassis 854 may house a number of hardware components along with the flexible sheet antenna indicated by a flexible sheet antenna location 848 in FIG. 8. In an embodiment, the display chassis 854 may include a camera 853 that may be placed at a top portion of the display chassis 854 where the flexible sheet antenna 848 has also been placed. In this example embodiment, the flexible sheet antenna 848 may be placed on a side of the camera 853 and at the top of the display chassis 854. In an embodiment, the video/graphics display device 810 may include a flat panel display and may also serve as an input device in those embodiments where the video/graphics display device 810 is a touch display device and may also be housed within the display chassis 854.

In an embodiment, the flexible sheet antenna 848 may include an antenna or a plurality of antennas formed in the display chassis 854 to wirelessly transceive with a network such as a WWAN wireless network, a WLAN wireless network and those other types of networks described herein. In an embodiment, an antenna formed on the flexible sheet antenna may include a PIFA. In this embodiment, the PIFA forms a high-band arm on the flexible sheet antenna 848 as described in embodiments herein.

The antenna formed on the flexible sheet antenna may include any number or type of antenna. In an embodiment, the flexible sheet antenna may include a plurality of transceiving arms that transceive at different frequencies. This may allow the information handling system to communicate via a plurality of networks such as a WWAN, WLAN, or other types of networks. In an embodiment, an antenna formed on the flexible sheet antenna may be a PIFA that forms a high-band arm on the flexible sheet antenna disposed at location 848. In an embodiment, this high-band antenna (e.g., a high band arm) formed on the flexible sheet antenna may transceive data at frequencies around 600 MHz to 6 GHz such as those frequencies covered by a 5G NRFR1. In another embodiment, the PIFA antenna may operate as an LTE antenna transceiving at frequencies at or around 600 MHz to 2.6 GHz.

In an embodiment, the flexible sheet antenna disposed at location 848 may also include a low-band arm formed thereon. This low-band arm of the flexible sheet antenna may be any type of antenna including for example, a monopole antenna, a dipole antenna, a directional antenna, a patch antenna, a PIFA, a slot antenna, a microstrip antenna, or another suitable antenna. In an embodiment, the low-band arm of the flexible sheet antenna may transceive at frequencies at or around 600 MHz to 960 MHz. In an embodiment certain mid-band frequencies may be covered via operation of the PIFA (e.g., high-band arm) using harmonic frequency resonances in order to transceive at these mid-band frequencies thereby covering those bands between the low-band arm and the high-band arm of the flexible sheet antenna disposed at location 848 in an embodiment.

Figure 9:
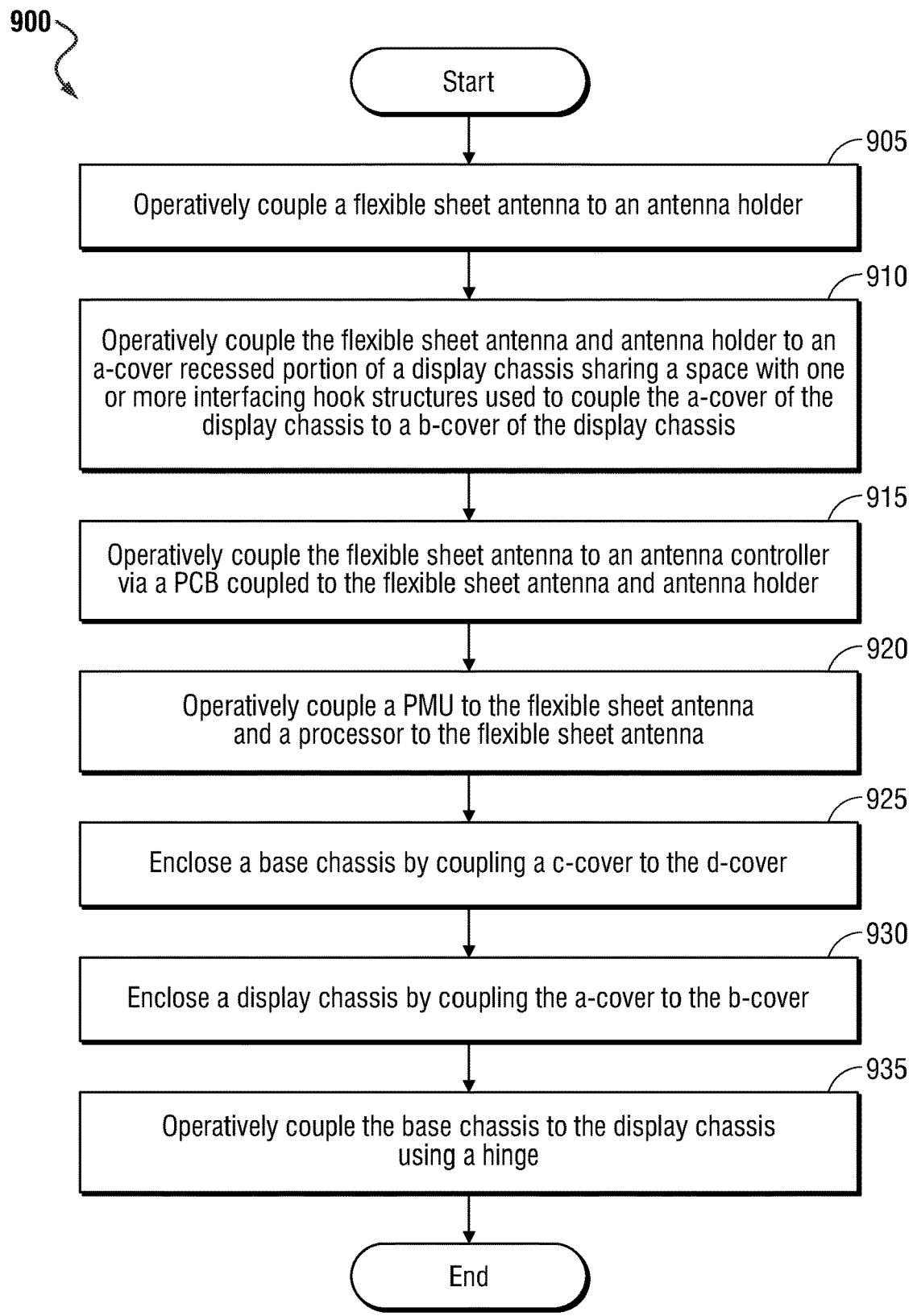
FIG. 9 is a flow diagram illustrating a method of manufacturing a flexible sheet antenna of an information handling system according to an embodiment of the present disclosure.

FIG. 9 is a flow diagram illustrating a method 900 of manufacturing a flexible sheet antenna of an information handling system according to an embodiment of the present disclosure. The method 900 may include, at block 905, operatively coupling a flexible sheet antenna to an antenna holder. As described herein, the display chassis of the information handling system may include a first chassis such as an a-cover and a second chassis such as a b-cover used to enclose a video/graphics display device, a camera, the flexible sheet antenna and antenna holder, among other hardware devices. In an embodiment, the flexible sheet antenna is wrapped around an antenna holder. The antenna holder may be made of an RF transparent material such as plastic in an embodiment. In an embodiment, the shape of the antenna holder may be such that it the antenna may be placed within a space where one or more interfacing hook structures used to couple a first chassis (e.g., a-cover) of the display chassis to a second chassis (e.g., b-cover or bezel) of the display chassis are formed along an outer edge of the display chassis. In an embodiment, the a-cover may include a recessed portion behind or near these one or more interfacing hook structures where the antenna may be placed to utilize previously unused space and form the flexible sheet antenna closer to the outer edge of the display chassis. In this embodiment, the size and shape of the antenna holder may be selected such that when the flexible sheet antenna is wrapped around the antenna holder, this formed antenna may be placed within this recess thereby limiting the amount of space that the antenna would have otherwise occupied within the display chassis. This reduces the size (e.g., the thickness) of the display chassis or otherwise allows for additional components to be placed within the display chassis such as a camera device, a sensor, or other hardware that may increase the functionalities of the information handling system or improve utilization of space within the display chassis.

The method may include operatively coupling the flexible sheet antenna and antenna holder to an a-cover recessed portion of a display chassis sharing a space with one or more interfacing hook structures used to couple the a-cover of the display chassis to a b-cover of the display chassis at block 910. These interfacing hook structures may be formed along outside edges of both the a-cover and b-cover at matching locations so that these interfacing hook structures may interface with each other to install the b-cover onto the a-cover.

The method 900 includes, at block 915, operatively coupling the flexible sheet antenna to an antenna controller via a PCB coupled to the flexible sheet antenna and antenna holder. In an embodiment, the PCB may provide for a location where an antenna front and may be placed. In an embodiment, the antenna front end (e.g., antenna front end 125, FIG. 1) may include tuning circuitry that allows an antenna controller to, via a wireless radio, operates at the frequencies at which the flexible sheet antenna transceives according to one or more radio protocols as described herein. Other circuitry may be included on the PCB such as an amplifier, a low pass filter, and a high-pas filter, among other circuitry. In an embodiment, the PCB may further include an antenna controller and a wireless radio that may otherwise have been included as hardware within the base chassis (e.g., the c-cover and d-cover chassis) of the information handling system.

The method may include, at block 920, operatively coupling a power source to the flexible sheet antenna and a PMU in the information handling system. The PMU and processor may be placed within the base chassis of the information handling system and provides power and processing resources, respectively, to the flexible sheet antenna. This process may further include operatively coupling the antenna radio to the processor to control the operations of the flexible sheet antenna to transceive data wirelessly as described herein.

The method 900 includes enclosing a base chassis of the information handling system by coupling a c-cover to the d-cover at block 925. As described herein, additional peripheral devices may be housed within the base chassis as well and the method 900 here may include enclosing a keyboard, trackpad, speakers, and other hardware devices within the base chassis.

The method 900 may also include enclosing a display chassis by coupling an a-cover to a b-cover at block 930. In an embodiment, the display chassis houses a display device and the a-cover and b-cover provide a level of protection for the display device from damage during operation. Again, the a-cover and b-cover may be secured to each other using the interfacing hook structures located by the flexible sheet antenna and antenna holder installed within the display chassis. In an embodiment, the interfacing hook structures may be formed along outside edges of both the a-cover and b-cover at matching locations so that these interfacing hook structures may interface with each other when the b-cover is installed onto the a-cover.

The method 900 may include, at block 935, operatively coupling the base chassis to the display chassis using a hinge. As described herein, the information handling system may be a laptop-type information handling system that allows for the information handling system to be placed in a plurality of configurations such as the clamshell configuration and the tablet configuration as described herein. In an embodiment, this laptop-type information handling system may be a 360-degree information handling system that allows for the information handling system to be placed in the tablet configuration. At this point, the method 900 may end.

The blocks of the flow diagrams of FIG. 9 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
   a processor;
   a memory;
   a power management unit (PMU);
   a display chassis housing a display device and a base chassis housing the processor and the memory;
   an antenna controller to provide instructions to a radio to cause a flexible sheet antenna to transceive wirelessly with a network;
   the flexible sheet antenna having an antenna structure formed on a flexible sheet circuit; and
   an antenna holder around which the flexible sheet antenna is wrapped and including a recess formed in the antenna holder to accommodate one or more interfacing hook structures coupled in a recessed interfacing hook edge space of an edge cavity portion of the display chassis housing,
   wherein the flexible sheet antenna and antenna holder are placed within the edge cavity portion of the display chassis and partially inserted in the recessed interfacing hook edge space of the edge cavity having the one or more interfacing hook structures used to couple a first chassis portion of the display chassis to a second chassis portion of the display chassis.

2. The information handling system of claim 1, wherein the first chassis portion of the display chassis comprises at least a portion of radiofrequency transparent material.

3. The information handling system of claim 1 further comprising:
   the antenna structure includes a planar inverted-F antenna to include a high band arm on the flexible sheet circuit and formed along a back surface of the flexible sheet antenna wrapped around the antenna holder.

4. The information handling system of claim 1 further comprising:
   the antenna structure includes a planar inverted-F antenna to include a low band arm on the flexible sheet circuit and formed along an outer surface of the flexible sheet antenna wrapped around the antenna holder and fitted into an edge cavity of display chassis such that a display device is disposed closer to the outer edge of the display chassis.

5. The information handling system of claim 1 further comprising:
   a printed circuit board (PCB) operatively coupled to a portion of the flexible sheet antenna wrapped around the antenna holder; and
   the PCB including a front-end tuning circuit.

6. The information handling system of claim 1, wherein the first chassis portion of the display chassis includes a radio frequency (RF) transparent window where the flexible sheet antenna is placed.

7. The information handling system of claim 1 further comprising:
   wherein the first chassis portion of the display chassis, the outer edge portion of the display chassis, and the second chassis portion of the display chassis are made of an RF transparent material.

8. The information handling system of claim 1 further comprising:
   the antenna structure includes a low band arm formed along an outer surface of the flexible sheet antenna wrapped around the antenna holder.

9. A wireless antenna system, comprising:
A flexible sheet antenna including an antenna structure formed on a flexible sheet circuit wherein the antenna structure formed on the flexible sheet circuit includes a first antenna arm and a second antenna arm;
an antenna holder around which the flexible sheet antenna is wrapped and including a recess formed in the antenna holder to accommodate one or more interfacing hook structures coupled in a recessed interfacing hook edge space of an edge cavity portion of a display chassis housing; and
an antenna controller to provide instructions to a radio to cause the flexible sheet antenna to transceive wirelessly with a network, the flexible sheet antenna and antenna holder are formed to fit within the recessed interfacing hook edge space of the edge cavity along an outer edge of the display chassis of an information handling system, where the recessed interfacing hook edge space includes one or more interfacing hook structures used to couple a back cover of the display chassis to an edge bezel cover of the display chassis.

10. The wireless antenna system of claim 9, wherein at least a portion of the back cover of the display chassis is comprised of a radiofrequency (RF) transparent material.

11. The wireless antenna system of claim 9 further comprising:
the first antenna arm includes a portion of a planar inverted-F antenna to form a low band arm of the flexible sheet antenna fitted into the edge cavity along the outer edge of the display chassis.

12. The wireless antenna system of claim 9, further comprising:
a grounding tape operatively coupled to the flexible sheet antenna.

13. The wireless antenna system of claim 9, further comprising:
a printed circuit board (PCB) operatively coupled to the flexible sheet antenna at the antenna holder;
the PCB including a front-end tuning circuit.

14. The wireless antenna system of claim 9, wherein the back cover of the display chassis includes a radio frequency (RF) transparent window where the flexible sheet antenna is placed.

15. The wireless antenna system of claim 9, wherein the back cover of the display chassis and the edge bezel cover of the display chassis is made of an RF transparent material.

16. The wireless antenna system of claim 9, further comprising:
the second antenna arm includes a portion of a planar inverted-F antenna to form a high band arm of the flexible sheet antenna.

17. A display device chassis for an information handling system, comprising:
the display device chassis housing a display device;
the flexible printed circuit board having an antenna structure formed on a flexible sheet antenna; and
an antenna holder around which the flexible sheet antenna is wrapped;
a flexible printed circuit board and the antenna structure formed on the flexible sheet antenna fitted into a recessed interfacing hook edge space of an edge cavity along an outer edge of the display device chassis of the information handling system;
one or more interfacing hook structures used to couple a first chassis cover portion of the display device chassis to a second chassis cover portion of the display device chassis operatively coupled within the recessed interfacing hook edge space of the edge cavity; and
a recess formed in the antenna holder to accommodate the one or more interfacing hook structures in the recessed interfacing hook edge space when the antenna holder and antenna structure formed on the flexible sheet antenna are partially inserted into the and partially inserted in a recessed interfacing hook edge space of the edge cavity of the display chassis.

18. The display device chassis for the information handling system of claim 17 further comprising:
the antenna structure includes a portion of a planar inverted-F antenna to form a low band arm of the flexible sheet antenna formed along an outer edge surface of the flexible sheet antenna wrapped around the antenna holder and fitted into the recessed interfacing hook edge space of the edge cavity along an outer edge of the display device chassis.

19. The display device chassis for the information handling system of claim 17 further comprising:
the antenna structure includes a portion of a planar inverted-F antenna to form a high band arm of the flexible sheet antenna formed along a back surface of the flexible sheet antenna wrapped around the antenna holder.

20. The display device chassis for the information handling system of claim 17, wherein the first chassis portion of the display chassis includes a radio frequency (RF) transparent window where the flexible sheet antenna is placed.

* * * * *